US012719707B2

(12) United States Patent
Chen et al.

(10) Patent No.: US 12,719,707 B2
(45) Date of Patent: Aug. 25, 2026

(54) USER AUTHORIZATION METHOD AND APPARATUS

(71) Applicant: SAMSUNG ELECTRONICS CO., LTD., Suwon-si (KR)

(72) Inventors: Xiao Chen, Nanjing (CN); Peng Zhang, Nanjing (CN); Delong Wang, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/039,393

(22) Filed: Jan. 28, 2025

(65) Prior Publication Data

US 2025/0175357 A1 May 29, 2025

Related U.S. Application Data

(63) Continuation of application No. PCT/KR2023/010398, filed on Jul. 19, 2023.

(30) Foreign Application Priority Data

Sep. 29, 2022 (CN) ........................ 202211198178.2

(51) Int. Cl.

*H04L 9/40* (2022.01)
*H04L 9/00* (2022.01)
*H04W 12/084* (2021.01)

(52) U.S. Cl.

CPC ............. *H04L 9/50* (2022.05); *H04W 12/084* (2021.01)

(58) Field of Classification Search

CPC ............................... H04L 9/50; H04W 12/084

(Continued)

(56) References Cited

U.S. PATENT DOCUMENTS 11,652,605 B2 5/2023 Turner et al.
11,909,879 B2 2/2024 Xue et al.

(Continued)

FOREIGN PATENT DOCUMENTS

CN 112702315 A * 4/2021 ......... H04L 63/0807
CN 113537986 A 10/2021

(Continued)

OTHER PUBLICATIONS

Wu et al., CN 112702315 A, English version, Apr. 23, 2021, all pages (Year: 2021).*

(Continued)

*Primary Examiner* — Haresh N Patel
(74) *Attorney, Agent, or Firm* — Sughrue Mion, PLLC

(57) ABSTRACT

A method of user authorization, may include: after a user logs into an account of a target application, generating by the target application, a first non-fungible token (NFT) asset based on target user information to be authorized, wherein the target user information is specified by the user in user information of the account; submitting and uploading the first NFT asset to a blockchain; and based on a third-party application client applying for authorization of the first NFT asset: generating by the target application, a second NFT asset based on information of the first NFT asset; and transferring the second NFT asset to the third-party application client, to inform a resource side of the blockchain that the third-party application client has obtained the authorization of the first NFT asset.

15 Claims, 10 Drawing Sheets

OAuth2.0 flowchart

(58) Field of Classification Search
USPC .......................................................... 726/21
See application file for complete search history.

(56) References Cited

U.S. PATENT DOCUMENTS

| | | | | |
|---|---|---|---|---|
| 2020/0005284 | A1 | 1/2020 | Vijayan | |
| 2022/0035936 | A1 | 2/2022 | Lin | |
| 2022/0101316 | A1 | 3/2022 | Cramer | |
| 2022/0198447 | A1 | 6/2022 | Haruna | |
| 2022/0215075 | A1 | 7/2022 | Goldston et al. | |
| 2022/0230175 | A1 | 7/2022 | Haruna et al. | |
| 2023/0015686 | A1 * | 1/2023 | Nusrat | A63F 13/335 |
| 2023/0017878 | A1 * | 1/2023 | Ho | G06F 40/205 |
| 2023/0042269 | A1 * | 2/2023 | Benedetto | G06N 20/00 |
| 2023/0043223 | A1 * | 2/2023 | Jakobsson | G06F 21/44 |
| 2023/0055064 | A1 * | 2/2023 | Dalmia | A63F 13/77 |
| 2023/0070389 | A1 * | 3/2023 | Madhusudhan | G06Q 10/083 |
| 2023/0070586 | A1 * | 3/2023 | Kapur | G06Q 20/123 |
| 2023/0071093 | A1 * | 3/2023 | Madhusudhan | G06Q 30/0601 |

FOREIGN PATENT DOCUMENTS

| | | | | |
|---|---|---|---|---|
| CN | 113554439 | A | 10/2021 | |
| CN | 114629684 | A | 6/2022 | |
| CN | 114707973 | A * | 7/2022 | H04L 63/0428 |
| CN | 114996349 | A | 9/2022 | |
| CN | 115603963 | A | 1/2023 | |
| KR | 10-2294571 | B1 | 8/2021 | |
| KR | 10-2372960 | B1 | 3/2022 | |
| KR | 10-2022-0129245 | A | 9/2022 | |
| WO | 2022/072624 | A1 | 4/2022 | |

OTHER PUBLICATIONS

Jiao et al., CN 114707973 A, English version, Jul. 5, 2022, all pages (Year: 2022).*

Office Action issued on Jun. 13, 2025 by the Chinese Patent Office in corresponding CN Patent Application No. 202211198178.2.

International Search Report and Written Opinion (PCT/ISA/210 and PCT/ISA/237) dated Oct. 20, 2023, issued by International Searching Authority for International Application No. PCT/KR2023/010398.

* cited by examiner

User authorization apparatus

1001

First NFT asset generation unit

1002

Second NFT asset generation unit

USER AUTHORIZATION METHOD AND APPARATUS

CROSS-REFERENCE TO RELATED APPLICATIONS

This application is a continuation application of International Application No. PCT/KR2023/010398 designating the United States, filed on Jul. 19, 2023, in the Korean Intellectual Property Receiving Office and claiming priority to Chinese Patent Application No. 202211198178.2, filed on Sep. 29, 2022, in the China National Intellectual Property Administration, the disclosures of which are incorporated by reference herein in their entireties.

BACKGROUND

1. Field

The present disclosure relates to computer application technologies, and more particularly, to a user authorization method and apparatus.

2. Description of Related Art

Open authorization (OAuth) is an open network standard related to authorization that allows users to authorize third-party applications to access their information stored on other service providers without providing user names and passwords to third-party mobile applications or sharing all contents of their data. OAuth, in version 2.0 currently, is widely used throughout the world.

FIG. 1 shows a protocol flow of OAuth2.0. As shown in FIG. 1, the protocol flow includes the following steps:

Step A: a client requests authorization from a user.

Step B: the client receives an authorization grant indicating that the client has been authorized.

Step C: the client uses the authorization grant to apply for an access token from an authorization server.

Step D: the authorization server issues the access token to the client after authenticating the identity of the client and the authorization grant.

Step E: the client uses the access token to apply for protected resources from a resource server.

Step F: the resource server verifies the access token. If valid, the requested protected resources are transmitted.

In the process of implementing the present disclosure, the inventors found that the above user authorization protocol has problems such as overload of the authorization server, large delay of the resource request, etc.

SUMMARY

In view of above, embodiments of the present disclosure can provide a user authorization method and apparatus, which can effectively reduce the delay of resource acquisition and avoid the overload of the authorization server.

One or more embodiments of the present disclosure propose following technical solutions.

According to one or more example embodiments, a method of user authorization, may include: after a user logs into an account of a target application, generating by the target application, a first non-fungible token (NFT) asset based on target user information to be authorized, wherein the target user information is specified by the user in user information of the account; submitting and uploading the first NFT asset to a blockchain; and based on a third-party application client applying for authorization of the first NFT asset: generating by the target application, a second NFT asset based on information of the first NFT asset; and transferring the second NFT asset to the third-party application client, to inform a resource side of the blockchain that the third-party application client has obtained the authorization of the first NFT asset.

The method may further include: based on the third-party application client requesting the resource side of the blockchain to use the account to acquire a resource service, transmitting by the third-party application client, a request to the resource side; querying by the resource side, a historical authorization record of the blockchain based on the request; determining whether the third-party application client has obtained the authorization of the first NFT asset and the authorization is in a valid state; and based on the third-party application client having obtained the authorization of the first NFT asset and the authorization being in the valid state, executing the resource service based on the account indicated by the request.

The generating the first NFT asset based on the target user information to be authorized, and submitting and uploading the first NFT asset to the blockchain may include: after the user logs into the account of the target application through a device, based on the device detecting that the user specifies the target user information as information to be authorized: acquiring by the target application, the target user information locally or from a server of the target application; generating the first NFT asset based on the target user information; and transferring the first NFT asset to a blockchain account of the user.

The target application generating the second NFT asset based on information of the first NFT asset may include: receiving a request, from the third-party application client, for the authorization of the first NFT asset; based on the request, confirming whether the user approves that the third-party application client obtains the authorization; and generating the second NFT asset based on the information of the first NFT asset based on the user confirming approval.

The method further may include: receiving a request, by the target application, to revoke the authorization based on an instruction of the user for revoking the authorization; generating, by the target application, a third NFT asset based on corresponding authorization revocation information; and transferring the third NFT asset to the third-party application client. A token type of the third NFT asset may be revocation.

The method may further include: based on the third-party application client detecting that an interval between a current time and a termination time of a validity period of the second NFT asset is less than a preset duration, receiving by the target application, a request from the third-party application client to extend a validity period of the authorization of the first NFT asset; generating by the target application, a new second NFT asset based on the authorization according to the request; and transferring the new second NFT asset to the third-party application client. A token validity period of the new second NFT asset may be set according to a preset extension time.

According to one or more example embodiments, a user authorization apparatus may include: a first non-fungible token (NFT) asset generation unit, configured to generate, after a user logs into an account of a target application, a first NFT asset based on target user information to be authorized, and submit and upload the first NFT asset to a blockchain, wherein the target user information is specified by the user in user information of the account; and a second NFT asset generation unit, configured to trigger, based on a third-party application client applying for authorization of the first NFT asset, target application to generate a second NFT asset based on information of the first NFT asset, and transfer the second NFT asset to the third-party application client, so that a resource side in the blockchain learns that the third-party application client has obtained the authorization of the first NFT asset.

According to one or more example embodiments, an electronic device may include: at least one processor; and at least one memory storing instructions that, when executed by the at least one processor, cause the at least one processor to: generate, after the a user logs into an account of a target application, a first non-fungible token (NFT) asset based on target user information to be authorized, submit and upload the first NFT asset to a blockchain, wherein the target user information is specified by the user in user information of the account; trigger based on a third-party application client applying for authorization of the first NFT asset, the target application to generate a second NFT asset based on information of the first NFT asset; and transfer the second NFT asset to the third-party application client, to inform a resource side of the blockchain that the third-party application client has obtained the authorization of the first NFT asset.

The instructions may further cause the at least one processor to: based on the third-party application client requesting the resource side in the blockchain to use the account to acquire a resource service, transmit a request to the resource side; receive a query, by the resource side, for a historical authorization record of the blockchain based on the request; determine whether the third-party application client has obtained the authorization of the first NFT asset and the authorization is in a valid state; and based on the third-party application client having obtained the authorization of the first NFT asset and the authorization being in the valid state, execute the resource service based on the account indicated by the request.

The instructions may further cause the at least one processor to: after the user logs into the account of the target application through the electronic device, based on the electronic device detecting that the user specifies the target user information as information to be authorized, acquire the target user information locally or from a server of the target application; and trigger the target application to generate the first NFT asset based on the target user information, and transfer the first NFT asset to a blockchain account of the user.

The instructions may further cause the at least one processor to: receive a request, from the third-party application client, for the authorization of the first NFT asset; based on the request, confirm whether the user approves that the third-party application client obtains the authorization; and generate the second NFT asset based on the information of the first NFT asset based on the user confirming approval.

The instructions may further cause the at least one processor to: receive a request to revoke the authorization based on an instruction of the user for revoking the authorization; generate a third NFT asset based on corresponding authorization revocation information; and transfers the third NFT asset to the third-party application client. A token type of the third NFT asset may be revocation.

The instructions may further cause the at least one processor to: receive a request, from the third-party application client to extend a validity period of the authorization of the first NFT asset; generate a new second NFT asset based on the authorization according to the request; and transfer the new second NFT asset to the third-party application client. A token validity period of the new second NFT asset may be set according to a preset extension time.

According to one or more example embodiments, a non-transitory computer-readable storage medium stores computer-readable instructions for performing the method.

According to one or more example embodiments, a method of user authorization, may include: generating a first non-fungible token (NFT) asset based on user information to be authorized; submitting and uploading the first NFT asset to a blockchain; and based on a third-party application client applying for authorization of the first NFT asset: generating a second NFT asset based on the first NFT asset; and transferring the second NFT asset to the third-party application client, to inform a resource side of the blockchain that the third-party application client has obtained the authorization of the first NFT asset.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

In order to make the object, technical solutions and merits of the present disclosure clearer, the present disclosure will be illustrated in detail hereinafter with reference to the accompanying drawings and specific examples.

Through research, the inventors found that specific reasons for the overload of the authorization server and large delay of the resource request in the existing authorization scheme are as follows.

Figure 1:
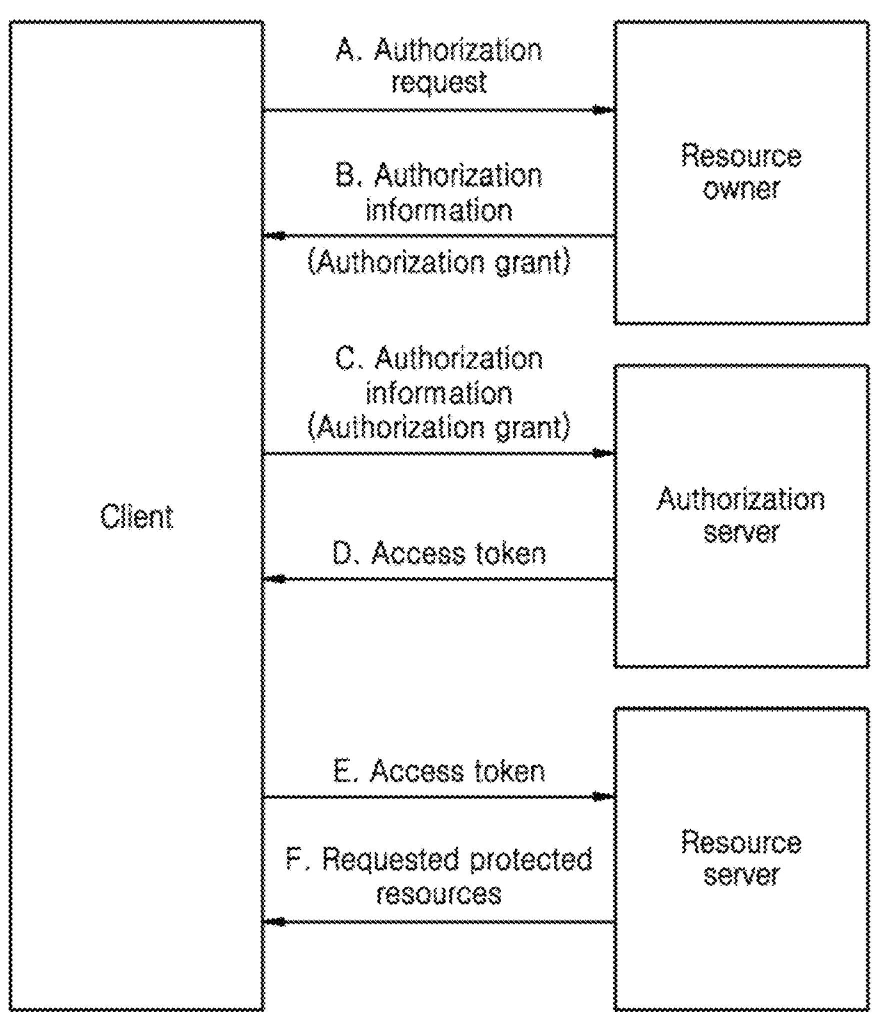
FIG. 1 is a schematic flowchart of an OAuth2.0 protocol according to related art.
Figure 2:
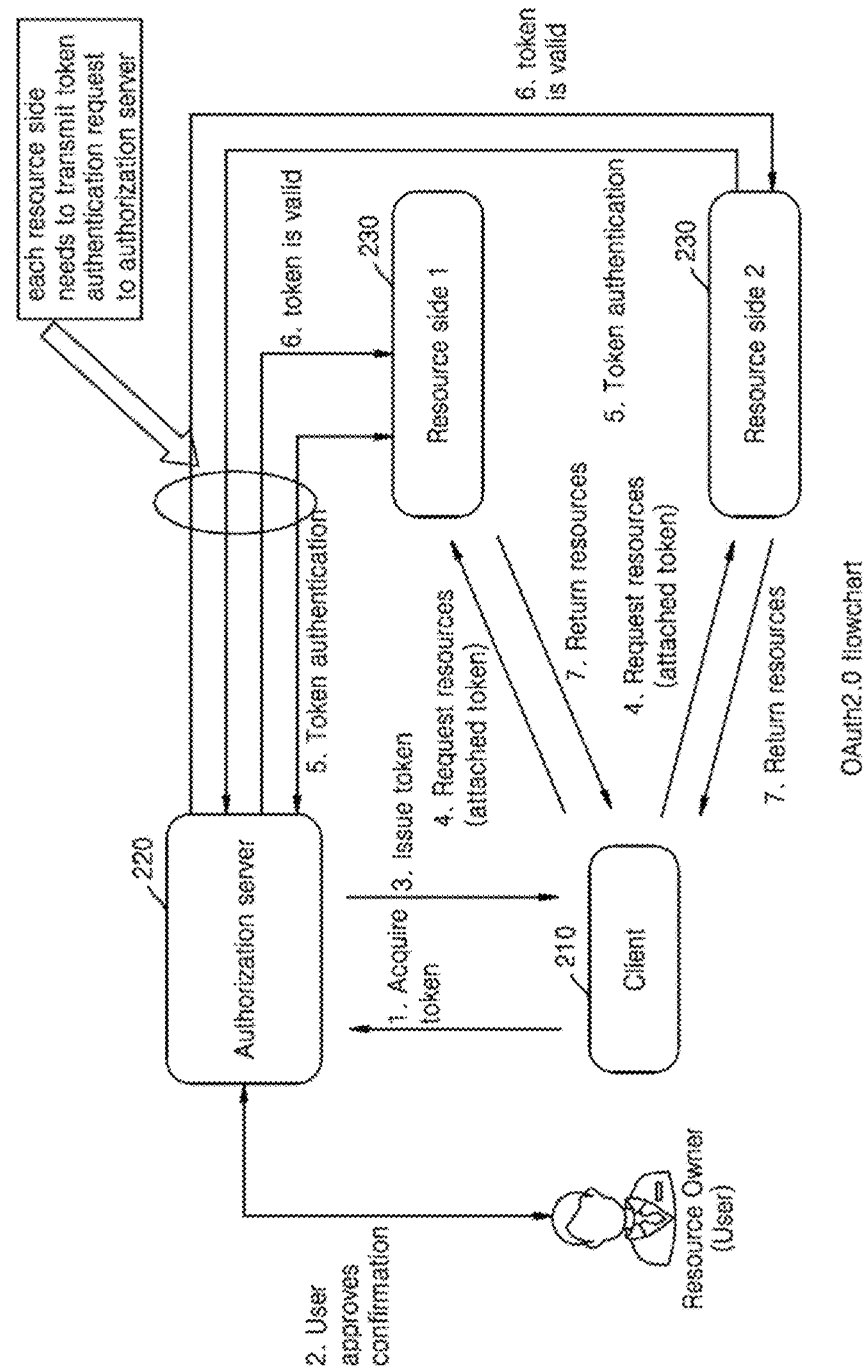
FIG. 2 is a schematic diagram of applying for authorization and acquiring resources based on the related art OAuth2.0 protocol.

The existing authorization scheme adopts a centralized authorization implementation scheme. A resource side (i.e., a resource server) does not participate in a token issuing process. Therefore, when receiving a resource request, it is necessary to additionally verify the validity of a token. As shown in FIG. 2, each time a client (210) requests for protected resources, the resource server needs to transmit a token authentication request to an authorization server (220). This will, on the one hand, lead to the overload of the authorization server (220); on the other hand, it will lead to a large delay due to the need for token authentication when the client (210) requests for the resources.

To solve the above problems, the present disclosure will provide a decentralized user authorization solution based on NFT technology. A user first saves user information on a blockchain in the form of a digital asset. As the participants of the blockchain, when the client (210) applies for authorization and the blockchain generates a digital asset containing authorization information and transfers it to the client (210), the resource side (230) will learn that the authorized digital asset is true and reliable. In this way, when the client (210) requests the resource side (230) for resources, the resource side (230) does not need to perform additional authentication, thereby increasing the security of authorization, reducing the delay of resource acquisition, and avoiding the overload of the authorization server (220).

Figure 3:
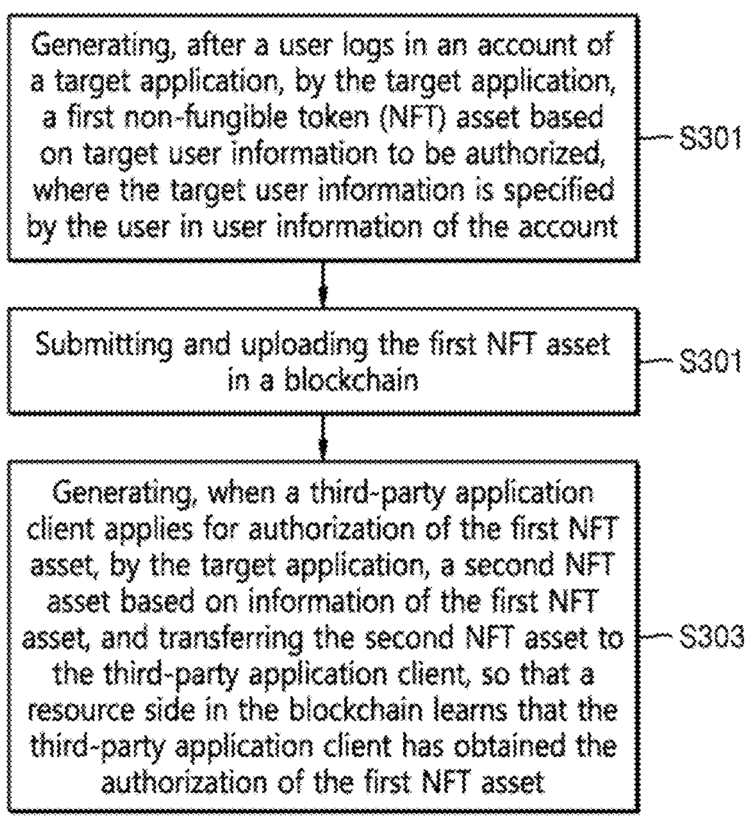
FIG. 3 is a schematic flowchart of a method according to one or more embodiments of the present disclosure.

FIG. 3 is a schematic flowchart of a method according to one or more embodiments of the present disclosure. As shown in FIG. 3, the user authorization implemented by the embodiment includes the following steps.

Step S301: after a user logs in an account of a target application, generate a first NFT asset based on target user information to be authorized. The target user information is specified by the user in user information of the account.

In one or more embodiments, after a user logs in an account of a target application, the electronic device may generate a first NFT asset based on target user information to be authorized.

This step is used to convert the user information needing to be authorized to other application clients into the NFT asset.

It should be noted that an NFT is an application based on the blockchain technology and is a special form of cryptocurrency. The blockchain technology can ensure that the ownership of the NFT is not violated. The NFT is transferable. That is, the NFT may be transferred on some specific transaction platforms, just like an artwork transaction market platform. Based on the blockchain technology, each transaction can be completely transparent and traceable. In addition, based on the blockchain's own advantages, the NFT has the inherent advantage of preventing counterfeiting. The NFT is issued by a smart contract, has a unique identifier (contract address+Token ID), and extracts and records information of digital content itself and casting information based on an ERC-721 open protocol. The information may include content code, description (containing user information), NFT casting time, NFT caster, NFT owner, etc.

In this step, to ensure the security of the NET asset generation operation, the NFT asset corresponding to the user information should be generated after the user successfully logs in the account of the target application.

Specifically, after the user logs in the account of the target application, all or part of the user information may be selected from the account as target user information (such as account information, payment information, etc.) to be authorized according to authorization requirements.

Here, a specific generation method for the NFT asset may be implemented using the existing technology, and will not be described in detail herein.

Step S302: submit and upload the first NFT asset to a blockchain.

This step is used to save the user information on the blockchain in the form of a digital asset for authorization processing based on the NET asset in subsequent steps.

In one or more embodiments, the electronic device may submit and upload the first NFT asset to a blockchain.

In one or more embodiments, the target application may submit and upload the first NFT asset to a blockchain.

In an implementation, a following method may be used to generate the first NFT asset based on the target user information to be authorized, and submit and upload the first NFT asset to the blockchain:

After the user logs in the account of the target application through a first device, the first device acquires the target user information locally or from a server of the target application when detecting that the user specifies the target user information as information to be authorized, triggers the target application to generate the first NFT asset based on the target user information, and transfers the first NFT asset to a blockchain account of the user.

Step S303: when a third-party application client applies for authorization of the first NFT asset, trigger a target application in the blockchain to generate a second NFT asset based on authorization information of the first NFT asset, and transfer the second NFT asset to the third-party application client, so that a resource side in the blockchain learns that the third-party application client has obtained the authorization of the first NFT asset.

In one or more embodiments, when a third-party application client applies for authorization of the first NFT asset, the electronic device may trigger a target application in the blockchain to generate a second NFT asset based on authorization information of the first NFT asset, and transfer the second NFT asset to the third-party application client, so that a resource side in the blockchain learns that the third-party application client has obtained the authorization of the first NFT asset.

In one or more embodiments, when a third-party application client applies for authorization of the first NFT asset, the target application may generate a second NFT asset based on authorization information of the first NFT asset, and transfer the second NFT asset to the third-party application client, so that a resource side in the blockchain learns that the third-party application client has obtained the authorization of the first NFT asset.

In this step, when the third-party application client needs to obtain the authorization of user information to be authorized, it is required to trigger the blockchain to generate, based on the authorization information of a corresponding NFT asset (i.e., the first NFT asset), a digital asset (i.e., the second NFT asset) of the authorization information. In this way, the resource side in the blockchain will learn that the corresponding authorization is true and reliable based on the generation of the second NFT asset. After that, when the third-party application client acquires resources based on a corresponding authorized account, it is unnecessary to trigger the smart contract for authorization to perform additional authentication on the third-party application client, thereby ensuring the security of authorization, avoiding the overload of the authorization server, and effectively reducing the delay of resource request processing.

In practical applications, the third-party application client may be installed in user equipment used when creating the first NFT asset, or may be installed in another user equipment.

In an implementation, a following method may be used to trigger the target application to generate the second NFT asset based on the authorization information of the first NFT asset.

The third-party application client requests the smart contract to obtain the authorization of the first NFT asset, so that the smart contract notifies, based on the request, the user to confirm whether he/she approves that the third-party application client obtains the authorization, and generates the second NFT asset based on the corresponding authorization information when the user confirms that he/she approves.

Specifically, when receiving a message requesting to obtain the authorization of the first NFT asset from the third-party application client, the smart contract may notify the user to confirm whether he/she approves that the third-party application client obtains the authorization of the first NFT asset by creating user equipment of the first NFT asset (i.e., the above first device).

With the above steps 301 and 302, it can be realized that the third-party application client may obtain the secure authorization of specified user information. In an implementation, the following steps x1~x2 may be further used to enable the third-party application client to request resources from the resource side based on the acquired authorization of NFT asset.

Step x1: transmit a resource request to the resource side when the third-party application client requests the resource side in the blockchain to use the account to acquire a resource service.

Specifically, the resource request will carry identification information of the account, so as to notify the resource side to request to acquire the resource service based on the corresponding account.

Step x2: the resource side queries a historical authorization record of the blockchain based on the resource request, and determines whether the third-party application client has obtained the authorization of the first NFT asset and the authorization is in a valid state. If yes, the resource side executes a corresponding resource service operation based on an account indicated by the resource request.

Here, after receiving the resource request, the resource side may query the historical authorization record of the blockchain based on the identification information carried in the resource request, so as to learn whether the third-party application client has obtained the valid authorization of the first NFT asset. In this way, it is unnecessary to trigger the smart contract for authorization to perform additional authentication on the third-party application client.

In an implementation, in order to improve the flexibility of NFT asset authorization management, in the above method embodiment, the following method may be further used to enable the user to revoke the generated authorization of NFT asset.

The smart contract is requested to revoke the authorization based on an instruction of the user for revoking the authorization, so that the smart contract generates a third NFT asset based on the corresponding authorization revocation information, and transfers the third NFT asset to the third-party application client. A token type of the third NFT asset is revocation.

Specifically, the user may initiate the instruction for revoking the authorization after logging in the account of the target application.

In an implementation, in the above method embodiment, the third-party application client may further use the following steps y1-y2 to automatically extend the validity period of the generated NFT asset authorization.

Step y1: request the smart contract to extend the validity period of the first NFT asset authorization when the third-party application client detects that an interval between a current time and the termination time of the validity period of the second NFT asset is less than a preset duration.

It should be noted here that when generating the second NFT asset, the validity period of the second NFT asset may be set. In this step, when the third-party application client detects the end of the validity period of the second NFT asset, the smart contract is automatically requested for an extension, so as to ensure the validity of the digital asset of the authorization information.

Step y2: the smart contract generates a new second NFT asset based on the corresponding authorization information according to the request, and transfers the new second NFT asset to the third-party application client. A token validity period of the new second NFT asset is set according to a preset extension time.

The validity period of the second NET asset can be extended with step y2.

The extension time is used to define the time for the extension of the validity period. Specifically, an appropriate duration may be set by a person skilled in the art or a user according to actual requirements, and will not be described in detail herein.

Figure 4:
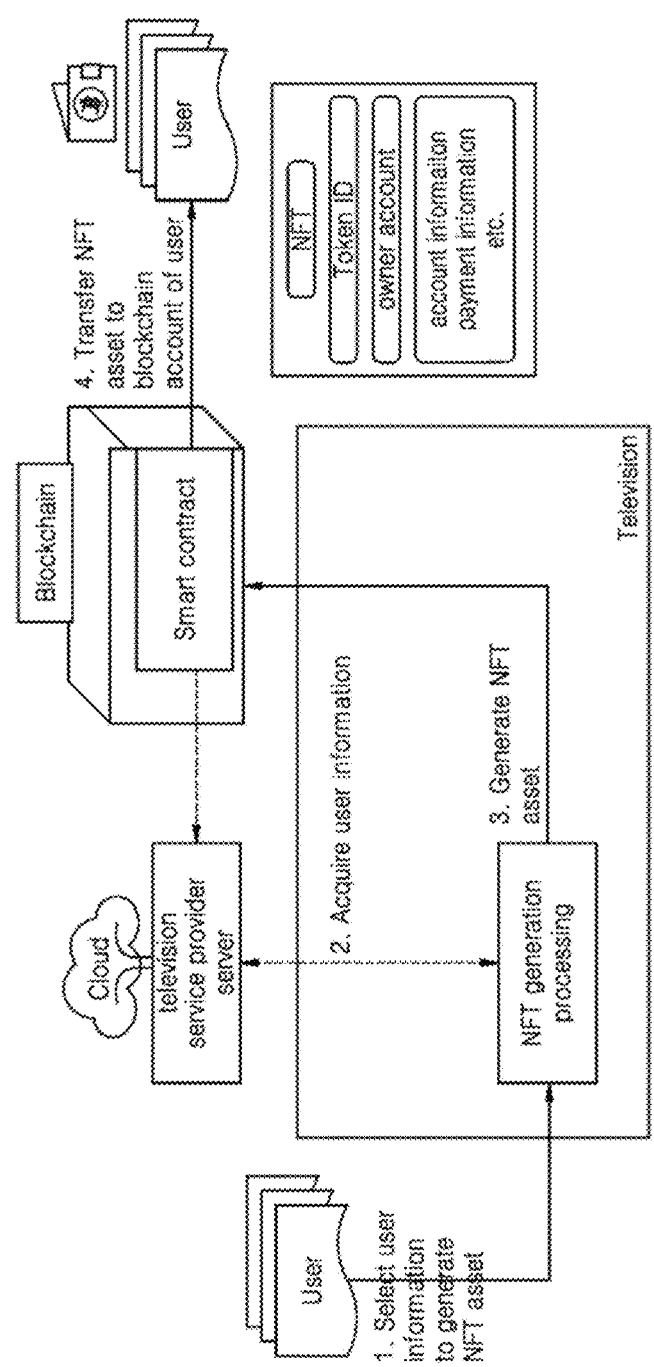
FIG. 4 is schematic diagrams of implementation applied to specific scenarios according to one or more embodiments of the present disclosure.

As can be seen from the above technical solutions, the method embodiment provides a decentralized user authorization method. By using the method, when an authorized client requests resources from the resource side, the resource side does not need to perform additional authentication, thereby increasing the security of authorization and reducing the delay of resource acquisition. Taking an application scenario wherein the first device is a television, a specific implementation of the above method embodiment will be illustrated with reference to FIGS. 4-9:

1. As shown in FIG. 4, the generation process of the first NFT asset includes the following steps.

Step 1: a user selects all or part of user information on the television to generate an NFT asset.

Step 2: the television exchanges the user information with a server of a television service provider.

Here, when finding that the user information selected by the user in step 1 is not stored locally, the television needs to interact with the server side to acquire the corresponding user information.

Step 3: the television generates the NFT asset containing the user information by using a smart contract of the television service provider in a blockchain.

Step 4: the smart contract of the television service provider transfers the generated NFT asset to a blockchain account of the user.

Figure 5:
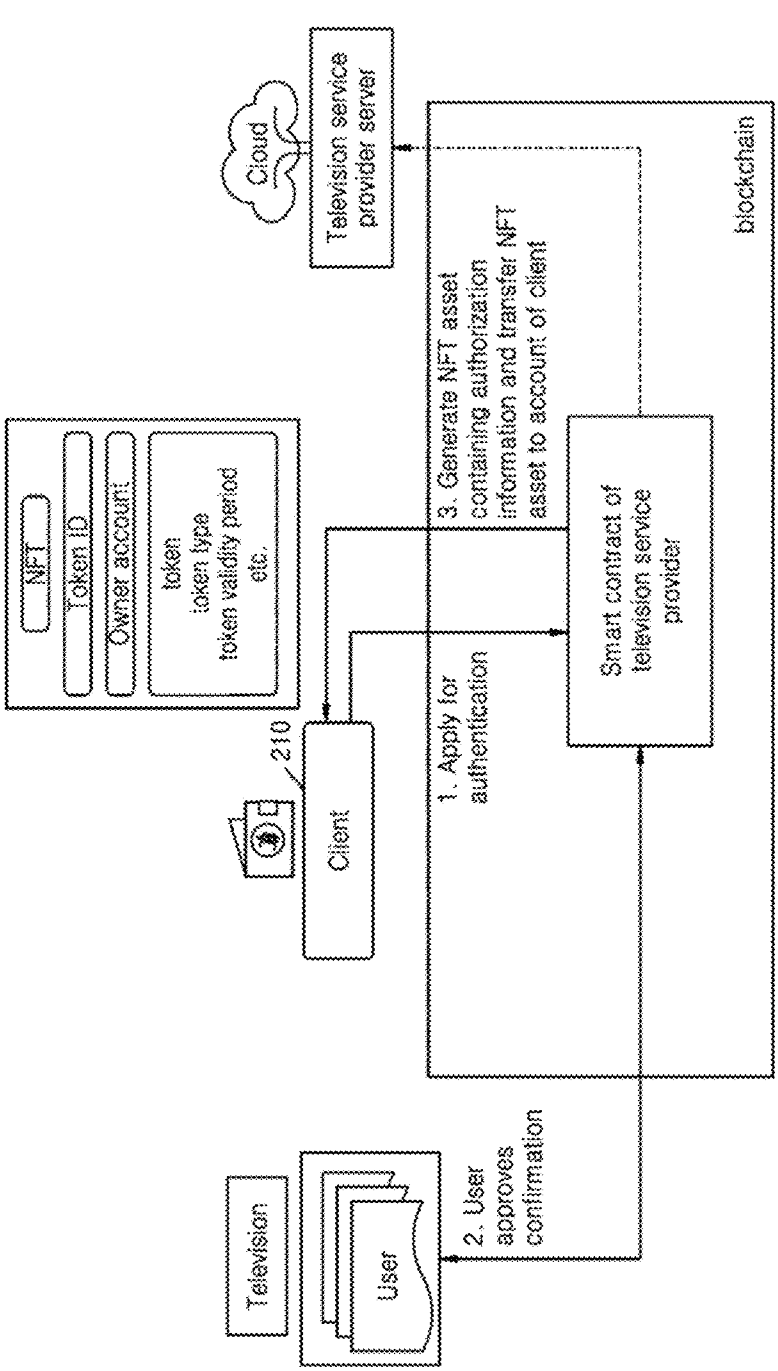
FIG. 5 is schematic diagrams of implementation applied to specific scenarios according to one or more embodiments of the present disclosure.

2. As shown in FIG. 5, the generation process of the second NFT asset includes the following steps.

Step 1: a client (210) applies for authorization from the smart contract of the television service provider in the blockchain.

Step 2: the smart contract of the television service provider triggers, through the television, the user to confirm whether he/she approves the authorization application of the client (210), and obtains the approval confirmation of the user.

Step 3: the smart contract of the television service provider generates an NFT asset (i.e., the second NFT asset) containing authorization information and transfers the NFT asset to the client (210). At the same time, the resource side (230) in the blockchain may also learn that the authorization obtained by the client (210) is true and reliable. When generating the second NFT asset, the smart contract needs to exchange information with the server of the television service provider.

Figure 6:
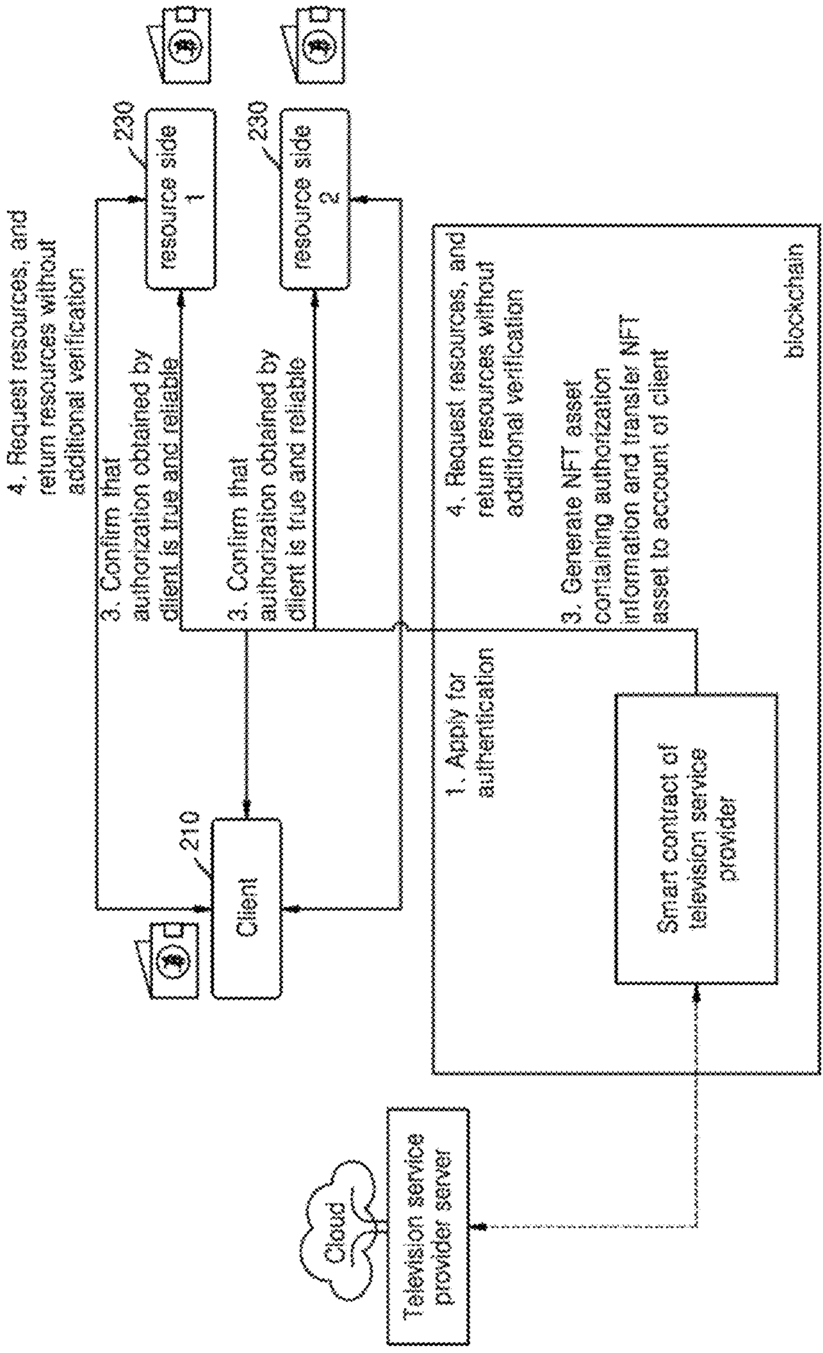
FIG. 6 is schematic diagrams of implementation applied to specific scenarios according to one or more embodiments of the present disclosure.

3. As shown in FIG. 6, the resource request process of the client (210) includes the following steps.

Firstly, through step 3 in FIG. 5, the client (210) obtains the NFT asset containing the authorization information. At the same time, the resource side (230) in the blockchain also confirms that the authorization obtained by the client (210) is true and reliable.

Then, through step 4, the client (210) requests resources from the resource side (230), and the resource side (230) directly returns the resources without additional verification.

Figure 7:
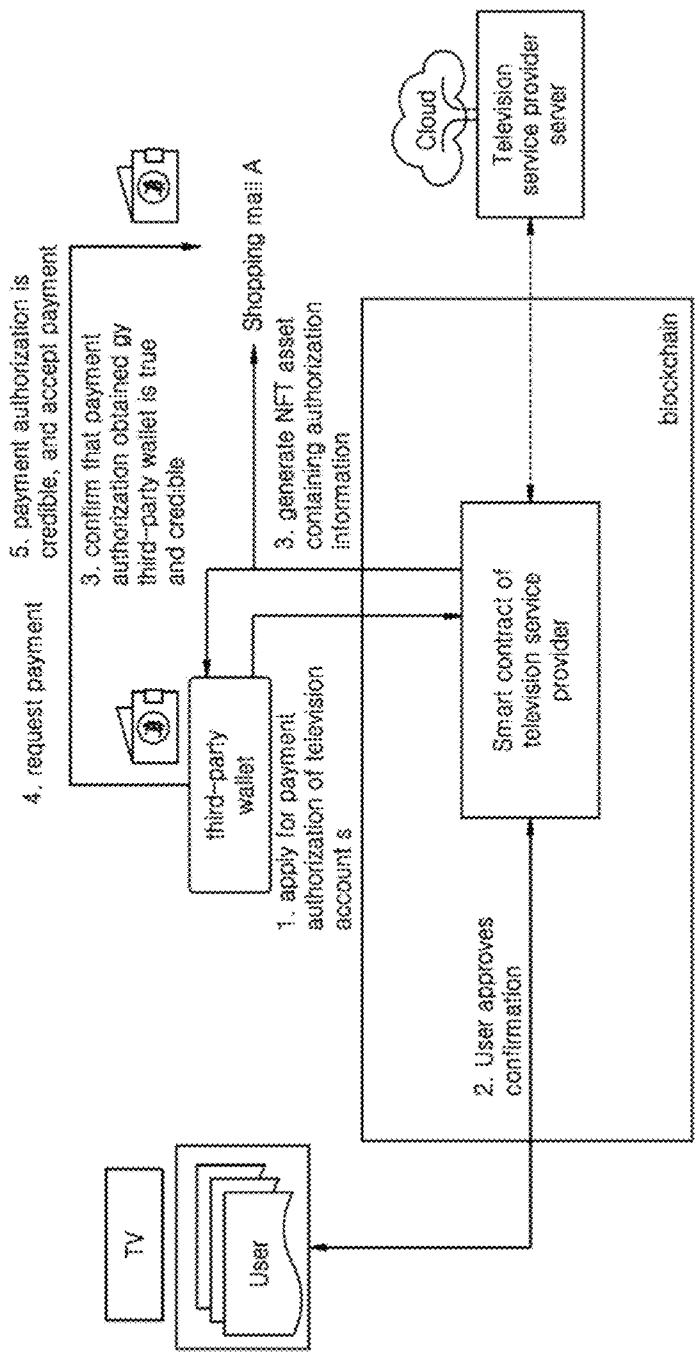
FIG. 7 is schematic diagrams of implementation applied to specific scenarios according to one or more embodiments of the present disclosure.

4. When the third-party application client (210) is a third-party wallet, one or more embodiments in which the third-party wallet acquires payment authorization and requests payment is shown. As shown in FIG. 7, this embodiment includes the following steps.

Step 1: the third-party wallet applies for the payment authorization of a certain television account s to the smart contract of the television service provider.

Step 2: the smart contract of the television service provider acquires authorization approval confirmation through the television.

Step 3: the smart contract of the television service provider generates an NFT asset (i.e., the second NFT asset) containing authorization information, sets a token type as payment, and transfers the NFT asset to the third-party wallet. At the same time, shopping mall A (the resource side (230)) in the blockchain also confirms that the payment authorization obtained by the third-party wallet is true and credible.

Step 4: the third-party wallet transmits a payment request to shopping mall A. The request contains account information indicating from which account money is deducted.

Step 5: shopping mall A accepts the payment request and completes the payment without additional verification.

Figure 8:
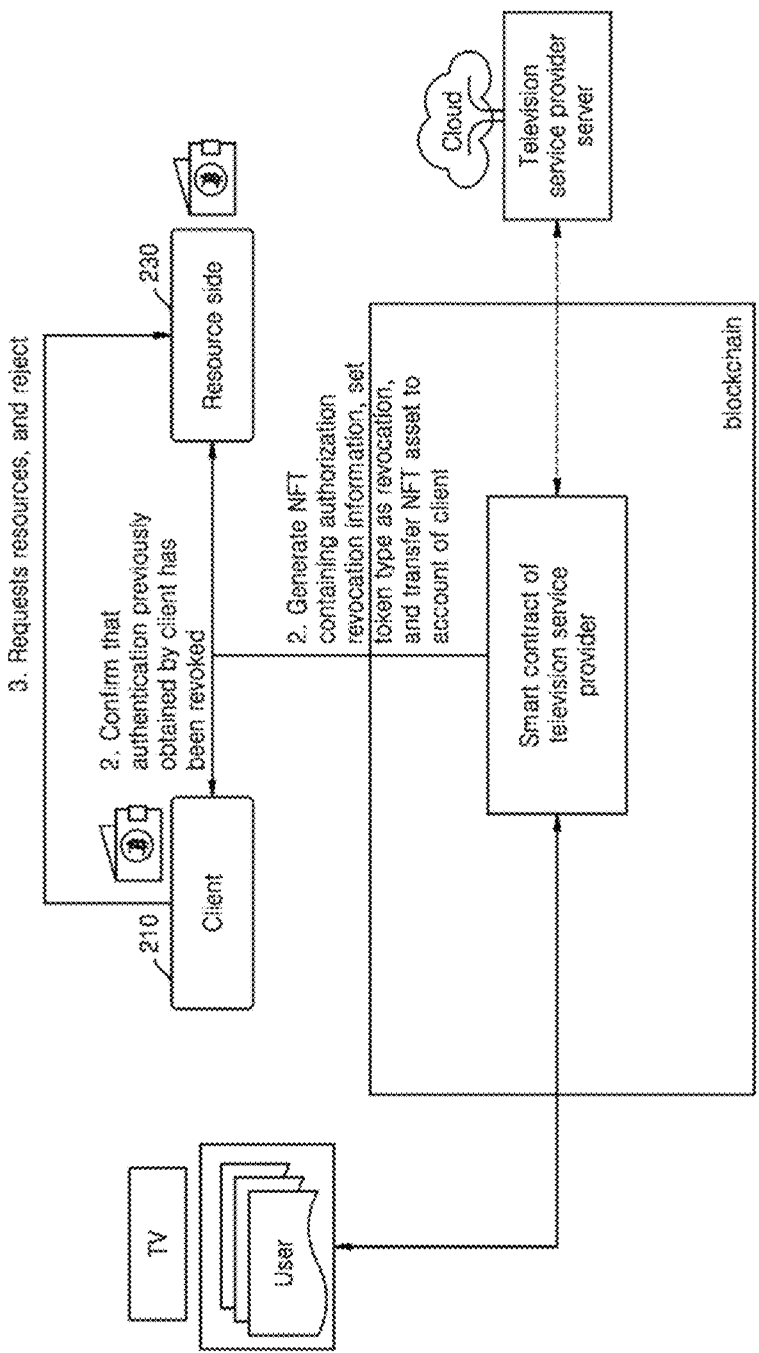
FIG. 8 is schematic diagrams of implementation applied to specific scenarios according to one or more embodiments of the present disclosure.

5. As shown in FIG. 8, the authorization revocation process of the user includes the following steps.

Step 1: the user initiates authorization revocation at the television side.

Step 2: the smart contract of the television service provider generates an NFT asset containing authorization revocation information, sets a token type as revocation, and transfers the NET asset to the client (210). At the same time, the resource side (230) in the blockchain also confirms that the authorization previously obtained by the client (210) has been revoked.

Step 3: the client (210) requests resources from the resource side (230), and the resource side (230) rejects the request.

Figure 9:
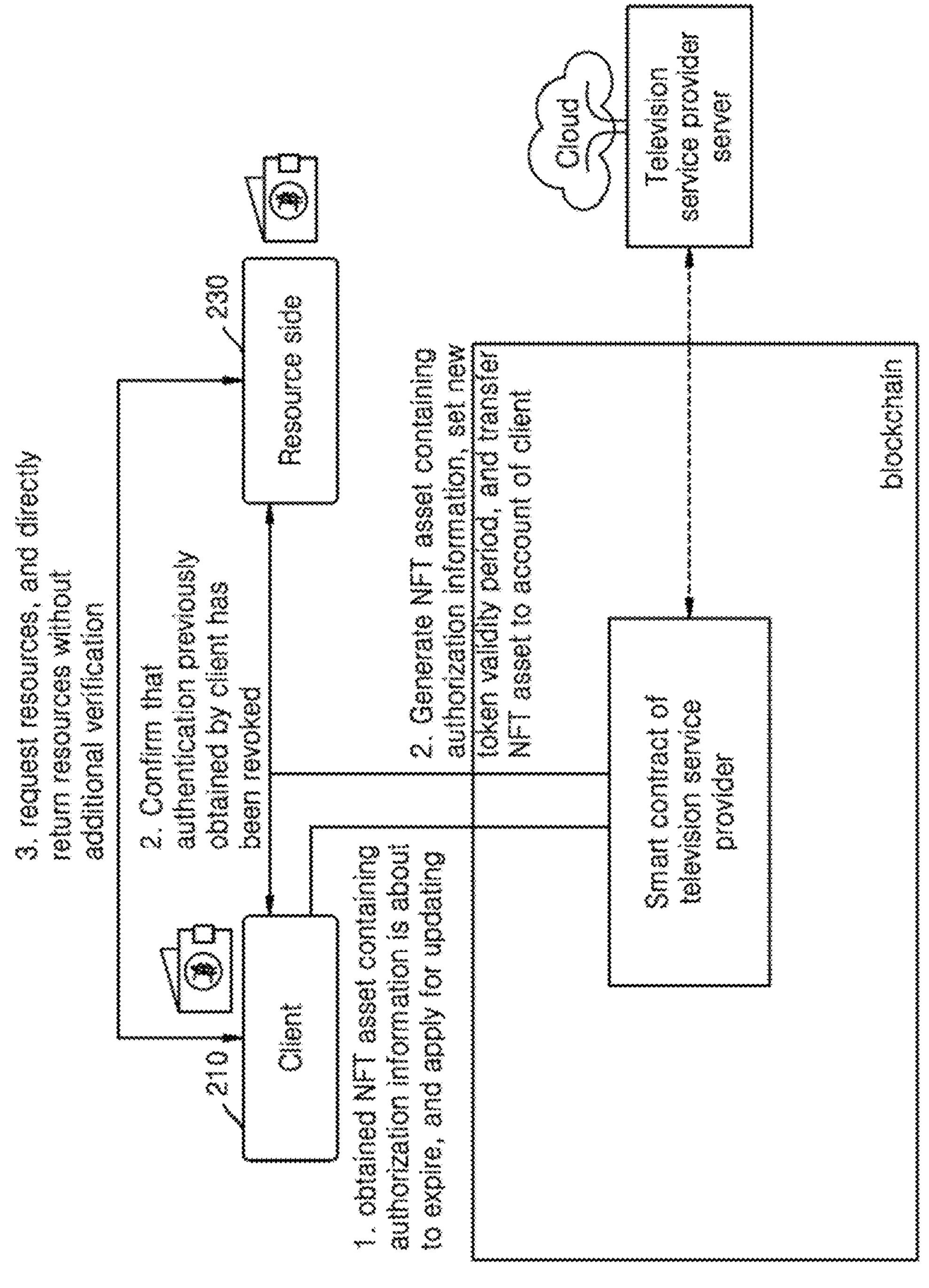
FIG. 9 is schematic diagrams of implementation applied to specific scenarios according to one or more embodiments of the present disclosure.

6. As shown in FIG. 9, the process of automatically updating the validity period of authorization includes the following steps.

Step 1: the NFT asset containing authorization information obtained by the client (210) is about to expire, and the client (210) applies for updating.

Step 2: the smart contract of the television service provider generates an NFT asset containing the authorization information, sets a new token validity period, and transfers the NFT asset to the account of the client (210). At the same time, the resource side (230) in the blockchain confirms that the NFT asset containing the authorization information newly acquired by the client (210) is true and credible.

Step 3: the client (210) requests resources from the resource side (230), and the resource side (230) directly returns the resources without additional verification.

Figures 10, 11:
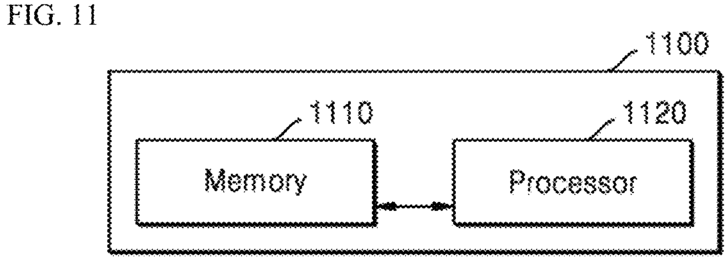
FIG. 10 is a schematic diagram of the structure of an apparatus according to one or more embodiments of the present disclosure.
FIG. 11 is a schematic diagram of the structure of an electronic device according to one or more embodiments of the present disclosure.

One or more embodiments of the present disclosure also proposes a user authorization apparatus based on the above method embodiment. As shown in FIG. 10, the apparatus includes:

a first NFT asset generation unit 1001, configured to generate, after a user logs in an account of a target application, a first NFT asset based on target user information to be authorized, and submit and upload the first NFT asset in a blockchain, the target user information being specified by the user in user information of the account; and a second NFT asset generation unit 1002, configured to trigger, when a third-party application client applies for authorization of the first NFT asset, a target application in the blockchain to generate a second NFT asset based on authorization information of the first NFT asset, and transfer the second NFT asset to the third-party application client, so that a resource side in the blockchain learns that the third-party application client has obtained the authorization of the first NFT asset.

FIG. 11 is a schematic diagram of the structure of an electronic device according to one or more embodiments of the present disclosure.

The electronic device (1100) may include a memory (1110) and a processor (1120).

The memory (1110) stores an application executable by a processor (1120) to perform the user authorization method as described above.

The memory (1110) stores an application executable by a processor (1120) to generate, after a user logs in an account of a target application, a first non-fungible token (NFT) asset based on target user information to be authorized.

The memory (1110) stores an application executable by a processor (1120) to submit and upload the first NFT asset in a blockchain.

The memory (1110) stores an application executable by a processor (1120) to generate, when a third-party application client applies for authorization of the first NFT asset, a second NFT asset based on information of the first NFT asset, and transfer the second NFT asset to the third-party application client, so that a resource side in the blockchain learns that the third-party application client has obtained the authorization of the first NFT asset.

The memory (1110) stores an application executable by a processor (1120) to trigger the target application to generate, when a third-party application client applies for authorization of the first NFT asset, a second NFT asset based on information of the first NFT asset, and transfer the second NFT asset to the third-party application client, so that a resource side in the blockchain learns that the third-party application client has obtained the authorization of the first NFT asset.

The processor (1120) may include RAM that stores signals or data input from outside of the electronic device (1100) or is used as a storage area corresponding to various operations performed by the electronic device (1100), and ROM that stores a control program for controlling the electronic device (1100).

Furthermore, the processor (1120) may include a plurality of processors.

For example, the processor (1120) may be implemented as a main processor and a sub processor operating in a sleep mode.

In addition, the processor (1120) may include at least one of a central processing unit (CPU), a graphic processing unit (GPU), or a video processing unit (VPU).

The processor (1120) may generate, after the user logs in an account of a target application, a first non-fungible token (NFT) asset based on target user information to be authorized, submit and upload the first NFT asset in a blockchain, wherein the target user information is specified by the user in user information of the account.

The processor (1120) may trigger when a third-party application client applies for authorization of the first NFT asset, the target application to generate a second NFT asset based on information of the first NFT asset, and transfer the second NFT asset to the third-party application client, so that a resource side in the blockchain learns that the third-party application client has obtained the authorization of the first NFT asset. When a third-party application client applies for authorization of the first NFT asset, the processor (1120) may generate a second NFT asset based on information of the first NFT asset, and transfer the second NFT asset to the third-party application client, so that a resource side in the blockchain learns that the third-party application client has obtained the authorization of the first NFT asset.

When the third-party application client requests the resource side in the blockchain to use the account to acquire a resource service, the processor (1120) may trigger the third-party application client to transmit a request to the resource side.

The processor (1120) may trigger the resource side to receive a query for a historical authorization record of the blockchain based on the request, determine whether the third-party application client has obtained the authorization of the first NFT asset and the authorization is in a valid state, and if yes, execute the resource service based on an account indicated by the request.

The processor (1120) may receive a request, from the third-party application client, for the authorization of the first NFT asset.

Based on the request, the processor (1120) may confirm whether the user approves that the third-party application client obtains the authorization, and generate the second NFT asset based on the information of the first NFT asset when the user confirms the approval.

The processor (1120) may receive a request to revoke the authorization based on an instruction of the user for revoking the authorization, generate a third NFT asset based on corresponding authorization revocation information, and transfers the third NFT asset to the third-party application client. A token type of the third NFT asset may be a revocation.

The processor (1120) may receive a request, from the third-party application client to extend a validity period of the authorization of the first NFT asset, generate a new second NFT asset based on the authorization information according to the request, and transfer the new second NFT asset to the third-party application client. A token validity period of the new second NFT asset may be set according to a preset extension time.

It should be noted that the above method and apparatus are based on the same inventive concept. Since the method and the apparatus adopt similar principles to solve the problems, the implementations of the apparatus and the method may be referred to each other, and the repetitions will not be described in detail.

Based on the one or more above method embodiments, one or more embodiments of the present disclosure also proposes an electronic device including a processor and a memory. The memory stores an application program that can be executed by the processor to cause the processor to perform the user authorization method as described above. Specifically, a system or apparatus with a storage medium may be provided. The storage medium stores software program codes that can implement the functions of any one of the one or more above embodiments, and can be read and executed by a computer (or a central processing unit (CPU) or a micro processor unit (MPU)) of the system or apparatus. Furthermore, part or all of actual operations may be completed by an operating system or the like that operates on the computer through instructions based on the program code. The program codes read from the storage medium may also be written to a memory set in an expansion board inserted in the computer or a memory set in an expansion unit connected to the computer. Then, the instructions based on the program codes cause a CPU or the like installed on the expansion board or the expansion unit to perform part or all of the actual operations, so as to realize the functions of any one of the implementations of the above user authorization method.

The memory may be specifically implemented as various storage medias such as an electrically erasable programmable read-only memory (EEPROM), a flash memory, and a programmable program read-only memory (PROM). The processor may be implemented to include one or more central processors or one or more field programmable gate arrays. The field programmable gate arrays are integrated with one or more central processor cores. Specifically, the central processors or the central processor cores may be implemented as CPUs or an MCUs.

One or more embodiments of the present disclosure implement a computer program product including computer programs/instructions, which, when executed by a processor, implement the steps of the user authorization method as described above.

It should be noted that not all the steps and modules in the above flowcharts and structure diagrams are necessary, and some steps or modules may be omitted according to actual requirements. The execution order of the various steps is not fixed and may be adjusted as required. The division of the various modules is only for the convenience of describing the functional division adopted. In actual implementations, one module may be implemented as multiple modules, and the functions of multiple modules may also be implemented by the same module. These modules may be located in the same device or in different devices.

Hardware modules in the various implementations may be implemented mechanically or electronically. For example, a hardware module may include a specially designed permanent circuit or logic device (e.g., a dedicated processor such as an FPGA or an ASIC) to perform a particular operation. The hardware module may also include a programmable logic device or circuit (e.g., including a general-purpose processor or other programmable processors) temporarily configured by software to perform a specific operation. As for the specific implementation of the hardware modules by a mechanical mean, or by a dedicated permanent circuit, or by a temporarily configured circuit (e.g., configured by software), it can be determined based on the consideration of cost and time.

As used herein, “schematic” means “serving as an instance, example, or illustration”. Any diagram and implementation described as “schematic” herein should not be interpreted as a more preferred or advantageous technical solution. For simplicity of the drawings, the figures only schematically show those portions related to the present disclosure and do not present actual structures of a product. In addition, for simplicity of the drawings and ease of understanding, only one of components with the same structure or function is schematically drawn or marked in some figures. As used herein, "one" does not mean that the number of portions related to the present disclosure is limited to "only one", and "one" does not mean that a case that the number of portions related to the present disclosure is "more than one" is excluded. As used herein, "up", "down", "front", "back", "left", "right", "inner", "outer", and the like are only used to indicate a relative positional relationship between related portions, and rather than limit the absolute position of these related portions.

The foregoing is not used to limit the protection scope of the present disclosure. Any modification, equivalent substitution and improvement without departing from the spirit and principle of the present disclosure are within the protection scope of the present disclosure.

A user authorization method includes generating, after a user logs in an account of a target application, a first non-fungible token (NFT) asset based on target user information to be authorized, and submitting and uploading the first NFT asset in a blockchain, the target user information being specified by the user in user information of the account and triggering, when a third-party application client applies for authorization of the first NFT asset, a target application in the blockchain to generate a second NFT asset based on authorization information of the first NFT asset, and transferring the second NFT asset to the third-party application client, so that a resource side in the blockchain learns that the third-party application client has obtained the authorization of the first NFT asset.

The method further comprising, when the third-party application client requests the resource side in the blockchain to use the account to acquire a resource service, transmitting, by the third-party application client, a request to the resource side and querying, by the resource side, a historical authorization record of the blockchain based on the request, determining whether the third-party application client has obtained the authorization of the first NFT asset and the authorization is in a valid state, and if yes, executing the resource service based on an account indicated by the request.

The method comprises, after the user logs in the account of the target application through a device, when the device detects that the user specifies the target user information as information to be authorized, acquiring, by the target application, the target user information locally or from a server of the target application, generating the first NFT asset based on the target user information, and transferring the first NFT asset to a blockchain account of the user.

The method comprises receiving a request, from the third-party application client, for the authorization of the first NFT asset, based on the request, confirming whether the user approves that the third-party application client obtains the authorization, and generating the second NFT asset based on the information of the first NFT asset when the user confirms the approval.

The method further comprising receiving a request, by the target application, to revoke the authorization based on an instruction of the user for revoking the authorization, generating, by the target application, a third NFT asset based on corresponding authorization revocation information, and transferring the third NFT asset to the third-party application client, wherein a token type of the third NFT asset is revocation.

The method further comprising, when the third-party application client detects that an interval between a current time and a termination time of a validity period of the second NFT asset is less than a preset duration, receiving a request from the third-party application client, by the target application, to extend a validity period of the authorization of the first NFT asset and generating, by the target application, a new second NFT asset based on the authorization information according to the request, and transferring the new second NFT asset to the third-party application client, wherein a token validity period of the new second NFT asset being set according to a preset extension time.

One or more embodiments of the present disclosure also proposes a user authorization apparatus, including a first NFT asset generation unit, configured to generate, after a user logs in an account of a target application, a first NFT asset based on target user information to be authorized, and submit and upload the first NFT asset in a blockchain, the target user information being specified by the user in user information of the account and a second NFT asset generation unit, configured to trigger, when a third-party application client applies for authorization of the first NFT asset, a target application in the blockchain to generate a second NFT asset based on authorization information of the first NFT asset, and transfer the second NFT asset to the third-party application client, so that a resource side in the blockchain learns that the third-party application client has obtained the authorization of the first NFT asset.

One or more embodiments of the present disclosure also proposes an electronic device, including a processor and a memory, the memory is configured to store an application program that can be executed by the processor, to cause the processor to perform the user authorization method as described above.

One or more embodiments of the present disclosure also proposes a computer-readable storage medium storing computer-readable instructions for performing the user authorization method as described above.

One or more embodiments of the present disclosure also proposes a computer program product including computer programs/instructions, which, when executed by a processor, implement the steps of the user authorization method as described above.

What is claimed is:

1. A method of user authorization, the method comprising:

after a user logs into an account of a target application, generating by the target application, a first non-fungible token (NFT) asset based on target user information to be authorized, wherein the target user information is specified by the user in user information of the account;

submitting and uploading the first NFT asset to a blockchain; and based on a third-party application client applying for authorization of the first NFT asset:

generating by the target application, a second NFT asset based on information of the first NFT asset; and transferring the second NFT asset to the third-party application client, to inform a resource side of the blockchain that the third-party application client has obtained the authorization of the first NFT asset.

2. The method of claim 1, further comprising:

based on the third-party application client requesting the resource side of the blockchain to use the account to acquire a resource service, transmitting by the third-party application client, a request to the resource side;

querying by the resource side, a historical authorization record of the blockchain based on the request;

determining whether the third-party application client has obtained the authorization of the first NFT asset and the authorization is in a valid state; and based on the third-party application client having obtained the authorization of the first NFT asset and the authorization being in the valid state, executing the resource service based on the account indicated by the request.

3. The method of claim 1, wherein the generating the first NFT asset based on the target user information to be authorized, and submitting and uploading the first NFT asset to the blockchain comprises:

after the user logs into the account of the target application through a device, based on the device detecting that the user specifies the target user information as information to be authorized:

acquiring by the target application, the target user information locally or from a server of the target application;

generating the first NFT asset based on the target user information; and transferring the first NFT asset to a blockchain account of the user.

4. The method of claim 1, wherein the target application generating the second NFT asset based on information of the first NFT asset comprises:

receiving a request, from the third-party application client, for the authorization of the first NFT asset;

based on the request, confirming whether the user approves that the third-party application client obtains the authorization; and generating the second NFT asset based on the information of the first NFT asset based on the user confirming approval.

5. The method of claim 1, further comprising:

receiving a request, by the target application, to revoke the authorization based on an instruction of the user for revoking the authorization;

generating, by the target application, a third NFT asset based on corresponding authorization revocation information; and transferring the third NFT asset to the third-party application client, wherein a token type of the third NFT asset is revocation.

6. The method of claim 1, further comprising:

based on the third-party application client detecting that an interval between a current time and a termination time of a validity period of the second NFT asset is less than a preset duration, receiving by the target application, a request from the third-party application client to extend a validity period of the authorization of the first NFT asset;

generating by the target application, a new second NFT asset based on the authorization according to the request; and transferring the new second NFT asset to the third-party application client, wherein a token validity period of the new second NFT asset is set according to a preset extension time.

7. A non-transitory computer-readable storage medium storing computer-readable instructions for performing the method of claim 1.

8. A user authorization apparatus comprising:

a first non-fungible token (NFT) asset generation unit, configured to generate, after a user logs into an account of a target application, a first NFT asset based on target user information to be authorized, and submit and upload the first NFT asset to a blockchain, wherein the target user information is specified by the user in user information of the account; and a second NFT asset generation unit, configured to trigger, based on a third-party application client applying for authorization of the first NFT asset, target application to generate a second NFT asset based on information of the first NFT asset, and transfer the second NFT asset to the third-party application client, so that a resource side in the blockchain learns that the third-party application client has obtained the authorization of the first NFT asset.

9. A method of user authorization, the method comprising:

generating a first non-fungible token (NFT) asset based on user information to be authorized;

submitting and uploading the first NFT asset to a blockchain; and based on a third-party application client applying for authorization of the first NFT asset:

generating a second NFT asset based on the first NFT asset; and transferring the second NFT asset to the third-party application client, to inform a resource side of the blockchain that the third-party application client has obtained the authorization of the first NFT asset.

10. An electronic device comprising:

at least one processor; and at least one memory storing instructions that, when executed by the at least one processor, cause the at least one processor to:

generate, after the a user logs into an account of a target application, a first non-fungible token (NFT) asset based on target user information to be authorized, submit and upload the first NFT asset to a blockchain, wherein the target user information is specified by the user in user information of the account;

trigger based on a third-party application client applying for authorization of the first NFT asset, the target application to generate a second NFT asset based on information of the first NFT asset; and transfer the second NFT asset to the third-party application client, to inform a resource side of the blockchain that the third-party application client has obtained the authorization of the first NFT asset.

11. The electronic device of claim 10, wherein the instructions further cause the at least one processor to:

based on the third-party application client requesting the resource side in the blockchain to use the account to acquire a resource service, transmit a request to the resource side;

receive a query, by the resource side, for a historical authorization record of the blockchain based on the request;

determine whether the third-party application client has obtained the authorization of the first NFT asset and the authorization is in a valid state; and based on the third-party application client having obtained the authorization of the first NFT asset and the authorization being in the valid state, execute the resource service based on the account indicated by the request.

12. The electronic device of claim 10, wherein the instructions further cause the at least one processor to:

after the user logs into the account of the target application through the electronic device, based on the electronic device detecting that the user specifies the target user information as information to be authorized, acquire the target user information locally or from a server of the target application; and trigger the target application to generate the first NFT asset based on the target user information, and transfer the first NFT asset to a blockchain account of the user.

13. The electronic device of claim 10, wherein the instructions further cause the at least one processor to:

receive a request, from the third-party application client, for the authorization of the first NFT asset;

based on the request, confirm whether the user approves that the third-party application client obtains the authorization; and generate the second NFT asset based on the information of the first NFT asset based on the user confirming approval.

14. The electronic device of claim 10, wherein the instructions further cause the at least one processor to:

receive a request to revoke the authorization based on an instruction of the user for revoking the authorization;

generate a third NFT asset based on corresponding authorization revocation information; and transfers the third NFT asset to the third-party application client, wherein a token type of the third NFT asset is revocation.

15. The electronic device of claim 10, wherein the instructions further cause the at least one processor to:

receive a request, from the third-party application client to extend a validity period of the authorization of the first NFT asset;

generate a new second NFT asset based on the authorization according to the request; and transfer the new second NFT asset to the third-party application client, wherein a token validity period of the new second NFT asset is set according to a preset extension time.

* * * * *